(12) United States Patent  (10) Patent No.: US 7,779,528 B2
Liepert  (45) Date of Patent: Aug. 24, 2010

(54) TEST GAS LEAK DETECTION USING A COMPOSITE MEMBRANE

(75) Inventor: Anthony G. Liepert, Lincoln, MA (US)

(73) Assignee: Virian, Inc., Santa Clara, CA (US)

( * ) Notice: Subject to any disclaimer, the term of this patent is extended or adjusted under 35 U.S.C. 154(b) by 54 days.

(21) Appl. No.: 12/205,642

(22) Filed: Sep. 5, 2008

(65) Prior Publication Data

US 2008/0313881 A1 Dec. 25, 2008

Related U.S. Application Data

(62) Division of application No. 11/711,993, filed on Feb. 28, 2007, now abandoned.

(51) Int. Cl.
*B23P 17/00* (2006.01)
*G01M 3/04* (2006.01)

(52) U.S. Cl. .......................... 29/592; 73/40.7

(58) Field of Classification Search ............. 73/40, 73/40.7; 29/592
See application file for complete search history.

(56) References Cited

U.S. PATENT DOCUMENTS 5,661,229 A * 8/1997 Bohm et al. .............. 73/40.7
6,527,833 B1 * 3/2003 Oyama et al. ............. 96/10

OTHER PUBLICATIONS

Lee, D. et al., "Gas Permeation Characteristics of a Hydrogen Selective Supported Silica Membrane", Journal of Membrane Science, vol. 200, 2002, pp. 291-306.*
Lee, D. et al., "Synthesis, Characterization, and Gas Permeation Properties of a Hydrogen Permeable Silica Membrane Supported on Porous Alumina", Journal of Membrane Science, vol. 231, 2004, pp. 117-126.*

* cited by examiner

*Primary Examiner*—Daniel S Larkin
(74) *Attorney, Agent, or Firm*—Bella Fishman; William R. McClellan (57) ABSTRACT

A leak detector includes a leak detector inlet to receive a test gas; a vacuum pump coupled to the leak detector inlet; a test gas sensing unit connected through a passage to the leak detector inlet; and a membrane that is permeable to the test gas disposed in the passage between the leak detector inlet and the test gas sensing unit, the membrane having a permeance to the test gas that varies by less than five percent over a temperature range of $T_0-20K$ to $T_0+20K$, where $T_0$ is a design temperature. In addition, methods are provided for making a composite membrane that includes a semi-permeable membrane and a porous membrane. Furthermore, a reference leak, which includes a composite membrane is provided.

10 Claims, 6 Drawing Sheets

TEST GAS LEAK DETECTION USING A COMPOSITE MEMBRANE

CROSS REFERENCE TO RELATED APPLICATIONS

This patent application is a Divisional of U.S. patent application Ser. No. 11/711,993, filed Feb. 28, 2007, now abandoned, titled "Test Gas Leak Detection Using a Composite Membrane," which is related to U.S. patent application Ser. No. 11/712,135, filed Feb. 28, 2007, now U.S. Pat. No. 7,497,110, titled "Methods and Apparatus for Test Gas Leak Detection."

FIELD OF THE INVENTION

This invention relates to detection of leaks in sealed articles and, more particularly, to test gas leak detection utilizing a composite membrane to pass the test gas to a test gas sensing unit, and to methods for making a composite membrane.

BACKGROUND OF THE INVENTION

Helium mass spectrometer leak detection is a well-known leak detection technique. Helium is used as a test gas, which passes through the smallest of leaks in a sealed test piece. After passing through a leak, a test sample containing helium is drawn into a leak detection instrument and is measured. In the instrument, a mass spectrometer tube detects and measures the helium. The input test sample is ionized and mass analyzed by the spectrometer tube in order to separate the helium component. In one approach, a test piece is pressurized with helium. A sniffer probe connected to the test port of the leak detector is moved around the exterior of the test piece. Helium passes through leaks in the test piece, is drawn into the probe and is measured by the leak detector. In another approach, the interior of the test piece is coupled to the test port of the leak detector and is evacuated. Helium is sprayed onto the exterior of the test piece, is drawn inside through a leak and is measured by the leak detector.

One of the difficulties associated with helium mass spectrometer leak detection is that the inlet of the mass spectrometer tube must be maintained at a relatively low pressure, typically $2 \times 10^{-4}$ Torr. In a so-called conventional leak detector, the test port, which is connected to the test piece or to the sniffer probe, must be maintained at relatively low pressure. Thus, the vacuum pumping cycle is relatively long. Furthermore, in the testing of leaky or large volume parts, it may be difficult or impossible to reach the required pressure level. If the required pressure level can be reached, the pumping cycle is lengthy.

Techniques have been proposed in the prior art to overcome this difficulty. A counterflow leak detector is disclosed in U.S. Pat. No. 3,690,151, issued Sep. 12, 1972 to Briggs, utilizes a technique of a reverse flow of helium through a diffusion pump to the mass spectrometer. The leak detector test port can be operated at the pressure of the diffusion pump foreline. A similar approach uses reverse flow of helium through a turbomolecular pump. U.S. Pat. No. 4,735,084, issued Apr. 5, 1988, to Fruzzetti, discloses a technique for gross leak detection wherein the test gas is passed in reverse direction through one or two stages of a mechanical vacuum pump. These techniques have permitted the test port pressure to be higher than for conventional leak detectors. Nonetheless, reaching the higher test port pressure can be difficult when testing large volumes, dirty parts, or parts with large leaks.

French Patent No. 1,181,312, published on Jun. 15, 1959, discloses a helium leak detector that uses a heated silica membrane to selectively pass helium and hydrogen. A getter is provided to capture the hydrogen, and an ionization gauge is used to measure the helium pressure. European Patent Application No. 0352371, published Jan. 31, 1990, discloses a helium leak detector including an ion pump connected to a probe in the form of a silica glass capillary tube. The silica glass tube is heated to a temperature between 300° C. (degrees Celsius) and 900° C. and thereby becomes permeable to helium. U.S. Pat. No. 5,325,708, issued Jul. 5, 1994, to DeSimon, discloses a helium detecting unit using a quartz capillary membrane, a filament for heating the membrane and an ion pump. U.S. Pat. No. 5,661,229, issued Aug. 26, 1997, to Bohm et al., discloses a leak detector with a polymer or heated quartz window for selectively passing helium to a gas-consuming vacuum gauge.

Leak detection techniques, which utilize a permeable membrane permit the test gas sensor to operate at a different pressure from the leak detector inlet. However, prior art membranes have had low permeance at room temperature and have typically required heating to a high temperature to increase permeance. The heated membrane requires a controlled heating source, thereby increasing the cost and complexity of the unit. In addition, the permeance of prior art membranes has had a relatively large temperature coefficient. Thus, the accuracy of leak detection depends in part on the accuracy with which the temperature of the membrane is controlled.

Leak detection techniques which utilize a permeable membrane are also vulnerable to too much helium reaching the ionization gauge, ion pump, or gas-consuming vacuum gauge. If a large leak is encountered, the resulting helium partial pressure outside the membrane drives a large number of helium atoms into the sensor. Once there, these sensors cannot rapidly bury all these helium atoms. This can render the leak detector inoperable, or with reduced sensitivity, for several minutes.

Accordingly, there is a need for improved methods and apparatus for leak detection.

SUMMARY OF THE INVENTION

According to a first aspect of the invention, a leak detector comprises a leak detector inlet to receive a test gas; a vacuum pump coupled to the leak detector inlet; a test gas sensing unit connected through a passage to the leak detector inlet; and a membrane that is permeable to the test gas disposed in the passage between the leak detector inlet and the test gas sensing unit, the membrane having a permeance to the test gas that varies by less than five percent over a temperature range of $T_0-20K$ to $T_0+20K$, where $T_0$ is a design temperature.

In other embodiments, the membrane has a permeance to the test gas that varies by less than one percent over a temperature range of $T_0-20K$ to $T_0+20K$, where $T_0$ is a design temperature.

According to a second aspect of the invention, a method is provided for making a composite membrane. The method comprises selecting a semi-permeable membrane having a permeance S to a test gas and a porous membrane having a permeance P to the test gas to satisfy an equation $$P^2 \frac{dS}{dT} + S^2 \frac{dP}{dT} = 0$$

where T is temperature and wherein the equation is evaluated at a temperature $T_0$; and forming a composite membrane including the selected semi-permeable membrane and the selected porous membrane.

According to a third aspect of the invention, a reference leak comprises an enclosure having an opening; a composite membrane sealing the opening, the composite membrane including a semi-permeable membrane and a porous membrane; and a test gas sealed within the enclosure.

BRIEF DESCRIPTION OF THE DRAWINGS

For a better understanding of the present invention, reference is made to the accompanying drawings, which are incorporated herein by reference and which.

DETAILED DESCRIPTION OF THE INVENTION

The invention relates in general to leak detectors that use one or more light gases as the test gas. Light gases include helium, hydrogen, neon, and isotopes thereof. Leak detection methods and apparatus include a membrane disposed between an inlet and a test gas sensing unit. The membrane is permeable to the light gases and selectively blocks heavier gases, i.e., all gases heavier than neon. Examples of test gas sensing units include an ion pump, an ionization gauge, a mass spectrometer, a magnetic sector mass spectrometer, a quadrupole mass spectrometer, a penning cell, a gas-consuming vacuum gauge, and a charge coupled device. From the output of the test gas sensing unit as a function of time and the valve modulation history, a near instantaneous test gas concentration, and hence leak rate, can be computed.

An issue in leak detectors which utilize a membrane that passes the test gas and selectively blocks heavier gases is how to terminate transmission of the test gas through the membrane rapidly in response, for example, to switching the leak detector from a test mode to a non-test mode. In the test mode, a connection is established between the inlet of the leak detector and the membrane. In the non-test mode, the inlet and the membrane are disconnected, typically by closing a valve. However, test gas trapped in the volume between the valve and the membrane continues to permeate through the membrane and is sensed by the test gas sensing unit, despite the fact that the valve is closed. Permeation of the test gas through the membrane can continue for unacceptably long times, even for relatively small trapped volumes. Thus, there is need for leak detector configurations which alleviate this problem.

Prior art configurations have terminated transmission of the test gas by deenergizing a membrane heater. However, it is desirable to very rapidly terminate transmission of the test gas through the membrane in configurations where the membrane operates between ambient temperature and about 100° C.

Preferably, transmission of the test gas through the membrane is substantially terminated in a time of five hundred milliseconds or less when the leak detector is switched from a test mode to a non-test mode or when termination of test gas transmission through the membrane is required for any other reason. More preferably, test gas transmission through the membrane is substantially terminated in a time of one hundred milliseconds or less. Most preferably, test gas transmission through the membrane is substantially terminated in a time of twenty-five milliseconds or less. As used herein, substantial termination of test gas transmission through the membrane refers to reducing test gas transmission through the membrane to less than 10% of its initial value, i.e., reducing test gas transmission by more than 90%. These parameters permit multiple leak tests to be performed in rapid succession without interaction between leak tests and without buildup of excess quantities of the test gas in the test gas sensing unit.

Figure 1:
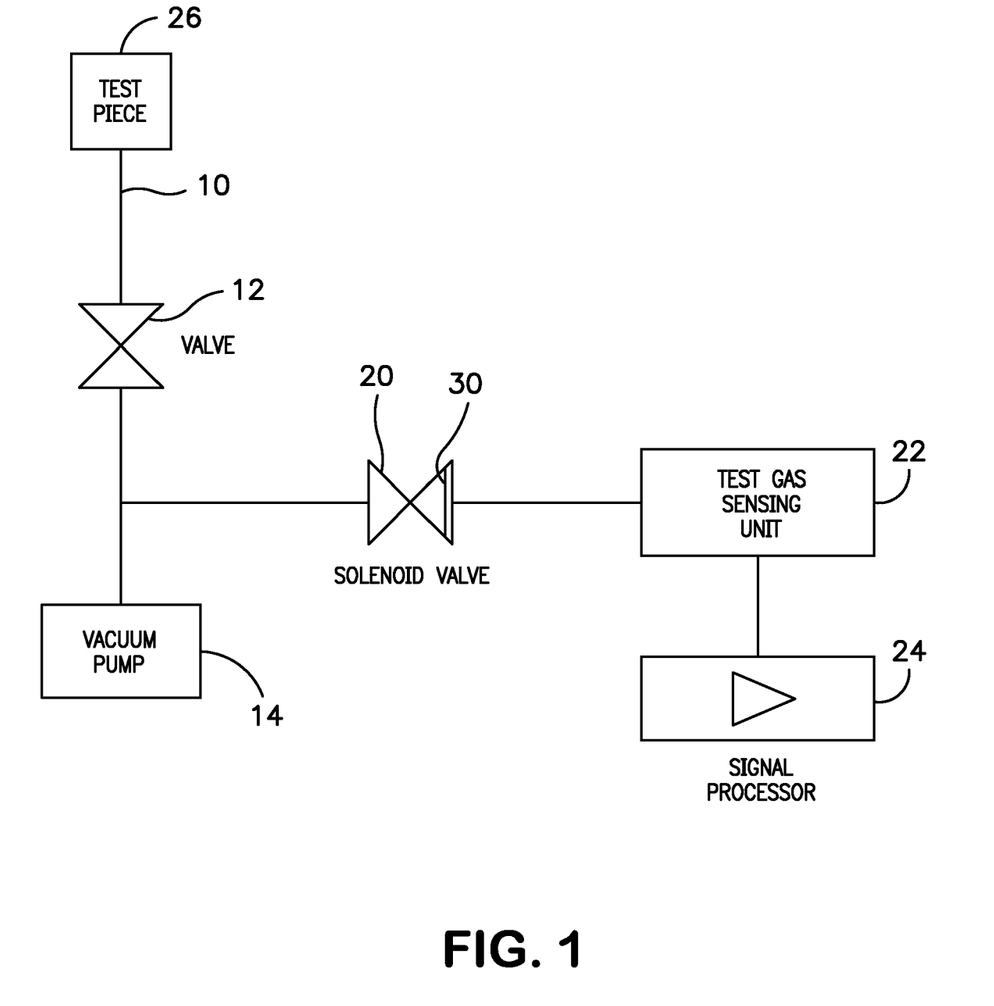
FIG. 1 is a simplified block diagram of a first example of a leak detector.

A schematic block diagram of a first example of a leak detector is shown in FIG. 1. A test port or leak detector inlet 10 is coupled through a valve 12 to a vacuum pump 14 and to an inlet of a valve, which can be a solenoid valve 20. As discussed below, solenoid valve 20 includes an integral membrane 30. An outlet of the solenoid valve 20 is coupled to a test gas sensing unit 22, which provides an electrical signal representative of test gas concentration to a signal processor 24.

Membrane 30 is incorporated into solenoid valve 20. The valve and membrane configuration limits the trapped gas volume on the inlet side of the valve when the valve is closed. The membrane 30 is a type, which permits operation between ambient temperature and about 100° C. The membrane 30 is described in detail below.

In one embodiment, vacuum pump 14 is a mechanical vacuum pump. Test gas sensing unit 22 can be an ion pump, an ionization gauge, a gas-consuming vacuum gauge, a mass spectrometer, a magnetic sector mass spectrometer, a quadrupole mass spectrometer, a penning cell, or a charge coupled device.

In operation, a test piece 26 or a sniffer probe (not shown) is connected vacuum-tight to inlet 10. Then valve 12 is opened, thus connecting inlet 10 to vacuum pump 14. Vacuum pump 14 reduces the inlet pressure from atmospheric pressure to an operating or test pressure level. Valve 20 is then opened to perform a leak test.

In one operating mode, test piece 26 is connected to inlet 10 and a test gas, such as helium, is introduced onto the outer surface of the test piece, such as by helium spray. Alternatively, if the test piece 26 is pressurized with helium, then the sniffer probe is moved around the outside of the test piece. The helium is drawn through leaks into the interior of the test piece 26, or is drawn into the sniffer probe, and passes into the leak detector through inlet 10. The helium then passes through valves 12 and 20 and through membrane 30 to test gas sensing unit 22. The test gas sensing unit 22 detects and measures helium and provides an output signal which is proportional to the quantity of helium in the gas sample received from the test piece or sniffer probe. The helium concentration is proportional to the leak rate of the test piece.

Figure 2:
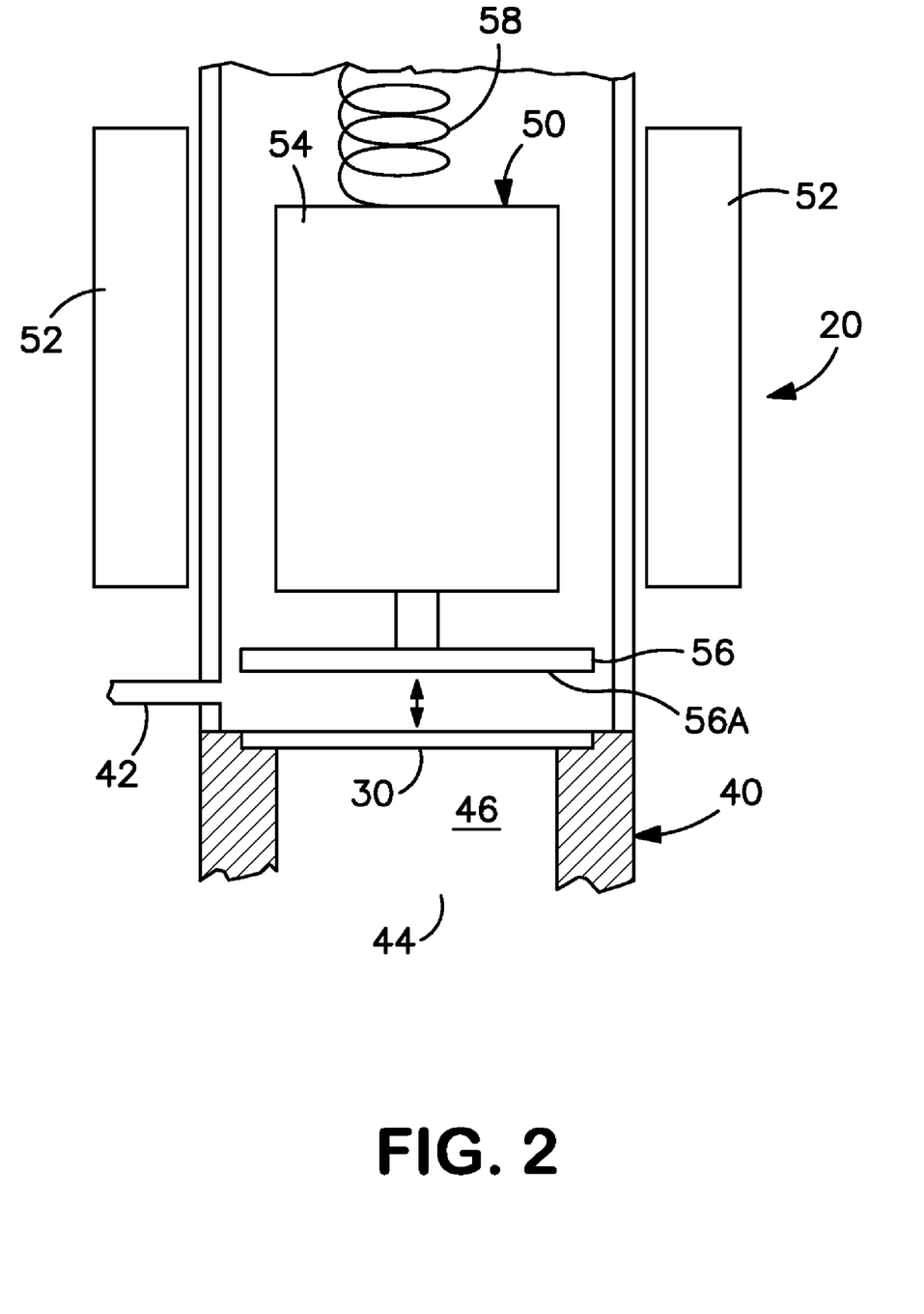
FIG. 2 is a partial cross-sectional view of an example of a valve which incorporates a membrane.

A cross-sectional diagram of an example of solenoid valve 20 and membrane 30 is shown in FIG. 2. Solenoid valve 20 includes a housing 40 which defines a valve inlet 42, a valve outlet 44 and a passage 46 between inlet 42 and outlet 44. Membrane 30 is integrally mounted in and sealed to passage 46 so that gas that flows through the valve is required to pass through membrane 30. Solenoid valve 20 further includes a valve closure member 50 and a coil 52 for moving valve member 50 between open and closed positions. As shown in FIG. 2, valve member 50 includes a plunger 54 and a rigidly-connected tip element 56. When coil 52 is energized, plunger 54 and tip element 56 are retracted to an open position, as shown in FIG. 2, thereby allowing flow of the test gas from inlet 42 through membrane 30 to outlet 44. When coil 52 is de-energized, a spring 58 biases tip element 56 into contact with membrane 30 so as to close the valve 20 and block the flow of gas through membrane 30. Tip element 56 is configured so that it fully blocks passage 46 and is in contact with membrane 30 in the closed position of the valve.

The tip element 56 may include a thin layer of relatively low durometer elastomer on a surface 56a that contacts membrane 30. When the solenoid valve 20 is de-energized, spring 58 pushes tip element 56 against membrane 30. The compliant elastomer material seals across the entire face of membrane 30, squeezing essentially all gas from between the surfaces. This configuration limits the trapped gas volume on membrane 30 when solenoid valve 20 is closed, as the trapped gas can contain a large number of test gas atoms. The valve stroke between open and closed positions may be small to enable rapid opening and closing of the valve.

Valve 20 has been described as a solenoid valve having an integral membrane, in which the valve closure member contacts the membrane in the closed position of the valve. It will be understood that different valve types and configurations may be utilized to limit the trapped gas volume on the inlet side of the membrane when the valve is closed.

Figure 3:
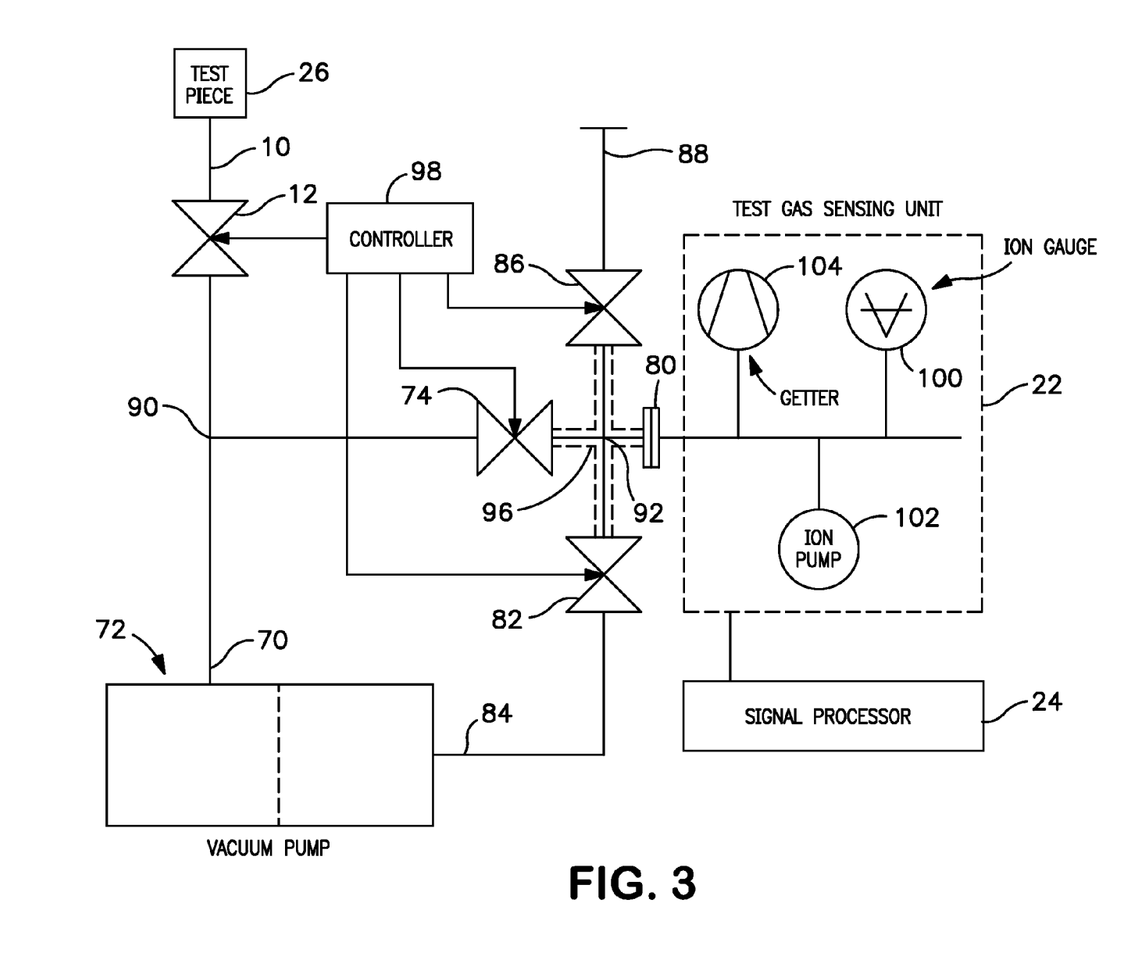
FIG. 3 is a simplified block diagram of a second example of a leak detector.

A schematic block diagram of a second example of a leak detector is shown in FIG. 3. Like elements in FIGS. 1 and 3 have the same reference numerals. Inlet 10 is coupled through valve 12 to a first inlet 70 of a vacuum pump 72. Inlet 10 is also coupled through valve 12 and a valve 74 to an inlet side of a membrane 80. Inlet side of membrane 80 is connected through a valve 82 to a second inlet 84 of vacuum pump 72. A valve 86 is connected between the inlet side of membrane 80 and an ambient air inlet 88. As shown in FIG. 3, valves 12 and 74 and first inlet 70 of vacuum pump 72 are connected to a node 90; and valves 74, 82 and 86 and the inlet side of membrane 80 are connected to a node 92. The conduits connected to node 92, i.e. the conduits that interconnect valves 74, 82 and 86 and membrane 80, define a volume 96. A controller 98 controls the opening and closing of valves 12, 74, 82 and 86.

A sensing side of membrane 80 is connected to test gas sensing unit 22, which provides an electrical signal representative of test gas concentration to signal processor 24. In the example of FIG. 3, test gas sensing unit 22 includes an ionization gauge 100, an ion pump 102 and a getter 104, all of which receive gas through membrane 80. In another example, the test gas sensing unit includes a gas consuming vacuum gauge and a getter.

The vacuum pump 72 may be a multi-stage diaphragm pump, a multi-stage roots pump, a multi-stage hook and claw pump, a multi-stage rotary or rolling piston pump, or a scroll pump. In one embodiment, vacuum pump 72 is a fifty liter-per-minute scroll pump having two inlets. Inlet 84 has a lower base pressure than inlet 70, so that the pressure in volume 96 is reduced when valve 82 is opened. In one example, inlets 84 and 70 may have base pressures (i.e., no mass flow condition) of about 100-300 millitorr and 100-300 Torr, respectively. In another embodiment, separate vacuum pumps are utilized. In this embodiment, a first vacuum pump is coupled to an inlet side of valve 74 (node 90), and a second vacuum pump is coupled to valve 82. As in the previous embodiment, the second vacuum pump has a lower base pressure than the first vacuum pump.

A small gas volume, typically less than 0.05 cubic centimeter, is trapped in volume 96 between valves 74, 82 and 86 and membrane 80. During a leak test, valve 12 is open, valve 86 is closed and valves 74 and 82 are actuated sequentially. With valve 82 closed, valve 74 is opened for a time period on the order of ten to five-hundred milliseconds to perform a leak test. Valve 74 is then closed. Valve 82 is opened immediately to discharge volume 96 to inlet 84 of vacuum pump 72. This very quickly reduces the total pressure and the test gas partial pressure at membrane 80 by a factor of about two-hundred. The repeated cycling of valves 74 and 82 results in a small mass flow rate to second inlet 84. It will be understood that the above parameter values are given by way of example only and are not limiting as to the scope of the invention.

Should the membrane 80 be exposed to high levels of the test gas, valve 86 can be opened in order to purge volume 96 with ambient air. The ambient air has a low partial pressure of the test gas.

The test gas sensing unit 22 is sensitive to the test gas, in this case helium. The ionization gauge 100 can sense extremely low partial pressures of helium. The ion pump 102 pumps away residual gases and helium. The current profile of both the ionization gauge 100 and the ion pump 102 can be used to compute helium partial pressure. Getter 104 may be utilized to capture hydrogen and minimize the false signal due to hydrogen interaction with the ionization gauge 100 or the ion pump 102.

In the leak detectors of FIGS. 1 and 3, membranes 30 and 80 are located between inlet 10 and test gas sensing unit 22. The membrane is a material that is permeable to the test gas used in the leak detector. The test gas is a light gas, such as helium, hydrogen, neon, and isotopes thereof. Helium is commonly used as the test gas. The membrane substantially passes the test gas while substantially blocking heavier gases, liquids and particles. The membrane thus acts as a test gas window by allowing the test gas to pass while blocking heavier gases, liquids and particles. In particular, the membrane has a relatively high permeance to the light test gas and a relatively low permeance to heavier gases, i.e., all gases heavier than neon. Thus, inlet 10 and test gas sensing unit 22 can be at different pressures. The membrane can be any suitable material that is permeable to the test gas and can have any shape or dimension. Examples of suitable materials include, but are not limited to, quartz glass, or silica, and permeable polymers, such as tetrafluoroethylene. In the leak detectors of FIGS. 1 and 3, the membrane is operated between ambient temperature and about 100° C.

Preferably, the membrane is a composite membrane that includes a porous membrane, which may function as a substrate, and a semi-permeable membrane in series. The net permeance of the composite membrane is substantially constant and independent of temperature in the vicinity of a design temperature $T_0$.

A semi-permeable membrane transmits only certain gases. Examples of semi-permeable membranes include variations of silicon dioxide, including quartz, quartz glass, fused silica, silica, PYREX (borosilicate glass), etc. Other semi-permeable membranes include polymers such as: TEFLON (fluoropolymer), TEFZEL (fluorocarbon polymer), FEP (a copolymer of hexafluoropropylene and tetrafluoroethylene), KAPTON (poly(4,4'-oxydiphenylene-pyromellitimide), MYLAR (polyethylene terephthalate), acetate, polyamide, etc. Light gases permeate through these membranes at significant permeation rates, but heavier gases, such as nitrogen and oxygen, have permeation rates many orders of magnitude lower. Light gases diffuse through a semi-permeable membrane by solid state diffusion. The pore size of the semi-permeable membrane is comparable to the gas atomic diameter, and the atoms move within the membrane lattice due to random thermal motion. The transmission rate per unit area, per unit pressure difference across the semi-permeable membrane of a particular gas, the permeance having units of [mole/(m² second Pascal)], is a strong function of temperature. The permeance of the semi-permeable membrane increases with increasing temperature.

The prior art has utilized the temperature dependence of quartz permeability to control helium transmission to a leak detector. A quartz disk or tube is typically heated to 400° C.-750° C. to obtain high rates of helium diffusion through the quartz. Heavy gases, such as air, are excluded because their atomic diameters are too large for almost all pores. Under certain operating conditions, such as the presence of too much helium, or in standby mode, the quartz temperature is reduced by switching off the heater. This reduces the permeation rate by a factor of one hundred to three hundred. For these devices, a membrane permeance that is a strong function of temperature is necessary and desirable.

A porous membrane transmits substantially all gases to varying degrees, depending on pore geometry. Pore diameters are several to many times the gas atomic diameters. Examples of porous membranes include sintered metals, alumina, zeolites, silicon carbide, etc., and certain glasses, such as Corning VYCOR (glass comprising 96% silica) 7930 glass. The primary method of gas transport through a porous membrane is by Knudsen diffusion. In Knudsen diffusion, the mean free path of a gas atom is much greater than the characteristic pore diameter. This results in a permeance that varies as $T^{-1/2}$. Permeance in Knudsen diffusion decreases with increasing temperature.

In general, the permeance of a porous membrane is orders of magnitude greater than the permeance of a practical semi-permeable membrane. If the porous membrane and the semi-permeable membrane are placed in series (so that the gas passes through both the porous membrane and the semi-permeable membrane) to form a composite membrane, the low permeance of the semi-permeable membrane dominates and the net permeance remains a strong function of temperature. If the permeances of the porous and semi-permeable membranes are of the same order of magnitude, then one or more design parameters can potentially be altered so that local temperature independence at a design temperature $T_0$, typically the nominal operating temperature, is achieved.

Preferably, the net permeance of the composite membrane has a permeance to the test gas that varies by less than five percent over a temperature range of $T_0-20K$ to $T_0+20K$, where $T_0$ is the design temperature and K is degrees Kelvin. More preferably, the membrane has a net permeance to the test gas that varies by less than one percent over the temperature range of $T_0-20K$ to $T_0+20K$. The design temperature $T_0$ may be about 300K. It will be understood that different variations in permeance and different temperature ranges are included within the scope of the present invention. For example, a membrane having a permeance to the test gas that varies by less than five percent over the operating temperature range of the leak detector may be utilized.

A design method is now described. A functional approximation of permeance as a function of temperature for the porous membrane and the semi-permeable membrane is needed. Since the two permeances are in series, the resulting net permeance is $$\frac{1}{N(T)} = \frac{1}{P(T)} + \frac{1}{S(T)} \quad \text{(Eq. 1)}$$

where N=net permeance, P=porous permeance, and S=semi-permeable permeance. Permeances P and S are a function of temperature T and of various geometric and physical constants, some of which can be changed. Equation (1) is solved for permeance N and then is differentiated with respect to temperature T. When $$\frac{dN}{dT} = 0 \text{ at } T = T_0 \quad \text{(Eq. 2)}$$

is satisfied, N(T) is approximately constant in the vicinity of temperature $T_0$. The resulting equation to be satisfied is $$P^2 \frac{dS}{dT} + S^2 \frac{dP}{dT} = 0 \text{ evaluated at } T = T_0 \quad \text{(Eq. 3)}$$

Since dP/dT is less than zero and all other terms are positive, a solution is possible, but not guaranteed. Material properties and dimensions which result in permeances P(T) and S(T) may not allow a solution. It has been determined that when a thin silica layer is combined with a moderate thickness of VYCOR 7930 glass, a family of solutions is possible.

Preferred embodiments include a substrate of VYCOR 7930 glass of a selected thickness with a thin layer of silica deposited on one or both sides of the glass substrate using chemical vapor disposition of tetraethyl orthosilicate (TEOS). Process details are described in U.S. Pat. No. 6,527,833, issued Mar. 4, 2003 to Oyama et al., which is hereby incorporated by reference. Corning VYCOR 7930 glass is a porous glass with a very uniform pore diameter of approximately 3.6 nanometers. A thin silica layer (approximately ten nanometers) results in a permeance greater than that of the VYCOR glass.

Figure 4:
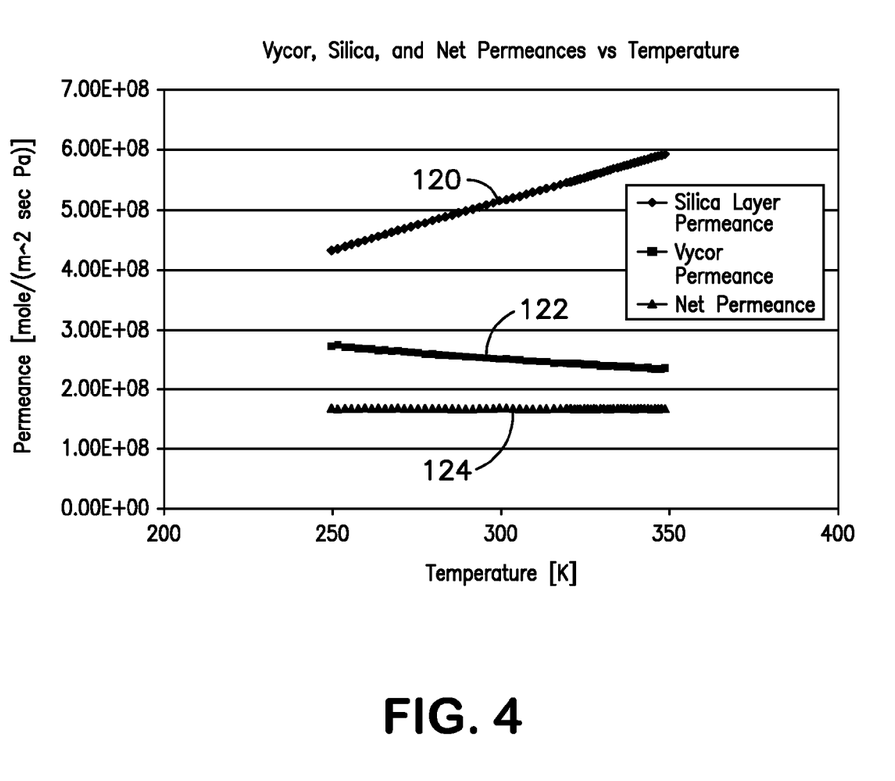
FIG. 4 is a graph of permeance as a function of temperature of a first example of a composite membrane.

The design method described above results in a solution with a VYCOR glass thickness of 1.45 millimeters and a silica thickness of ten nanometers. The permeance of the composite membrane has zero temperature dependence at T=300K and only very small deviations in the vicinity around 300K, as shown in FIG. 4. In FIG. 4, curve 120 represents the permeance of a silica layer as a function of temperature, curve 122 represents the permeance of VYCOR glass as a function of temperature, and curve 124 represents the net permeance of a composite membrane of silica and VYCOR glass as a function of temperature. Deviations from the 300K permeance value are less than 0.1 percent from 280K to 320K. This translates to a temperature coefficient of approximately 0.005% per degree C. By comparison, the permeance of a quartz layer by itself has a temperature coefficient of more than 2% per degree C. at 300K.

A composite membrane having flat geometry, such as a disk may be desirable. In this case, it may be easier to coat the entire disk with silica. This results in two silica layers of equal thickness on opposite sides of a VYCOR glass disk or sheet. The design process is similar to that described above. For a silica layer of equal thickness on opposite sides of a porous material, $$2P^2 \frac{dS}{dT} + S^2 \frac{dP}{dT} = 0 \text{ evaluated at } T = T_0 \quad \text{(Eq. 4)}$$

where P=porous permeance, S=single layer permeance, and $$N(T) = \frac{SP}{2P+S} \quad \text{(Eq. 5)}$$

The deposition process may be performed in a helium environment rather than in argon. The advantage of using helium is that once both sides of the VYCOR glass are sealed, helium can diffuse out, whereas argon would be trapped. When the VYCOR glass is sealed with silica, water and hydrocarbon contaminants cannot enter. This simplifies storage of the composite membrane.

Figure 5:
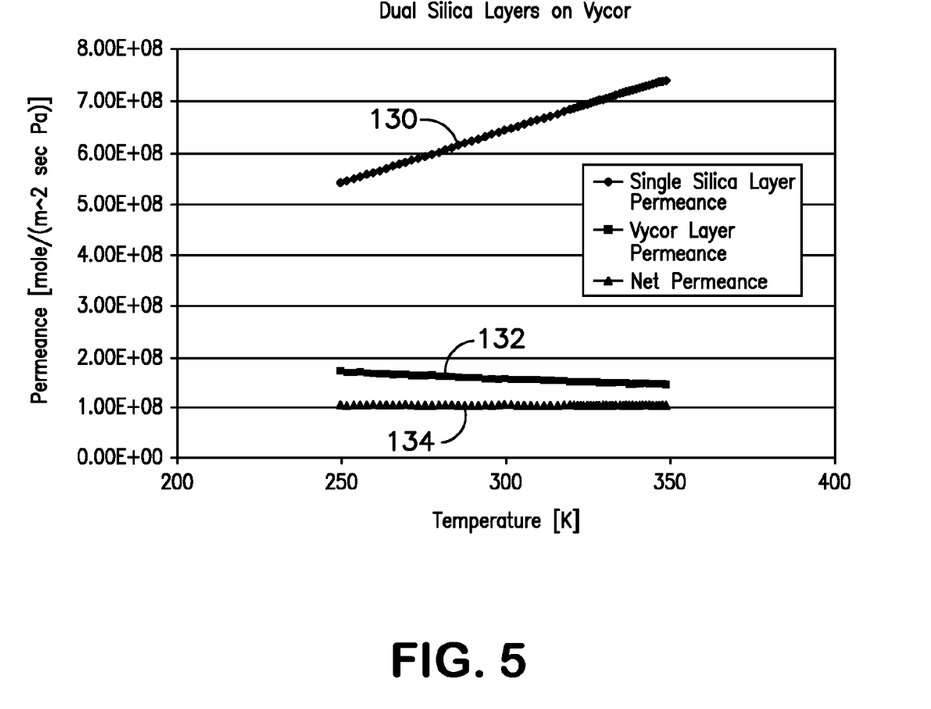
FIG. 5 is a graph of permeance as a function of temperature of a second example of a composite membrane.

FIG. 5 shows the permeances of a VYCOR glass substrate having a thickness of 2.327 millimeters and an eight nanometer layer of silica on both sides. In FIG. 5, curve 130 represents the permeance of silica, curve 132 represents the permeance of VYCOR glass, and curve 134 represents the net permeance of a composite membrane of VYCOR glass with a silica layer on both sides. Deviations from the 300K permeance value are less than 0.1 percent from 280K to 320K.

For the composite membrane described above, the variables available to satisfy equation (3) include silica layer thickness, VYCOR glass thickness and VYCOR glass pore diameter. The thickness of the silica layer is generally linear with TEOS decomposition time. Thicker or slightly thinner layers of silica can be deposited. Porous glasses with different pore diameters can be obtained. Various combinations of the three variables enable flexibility in satisfying equations (3) and (4) and in designing for a specific net permeance.

Figure 6:
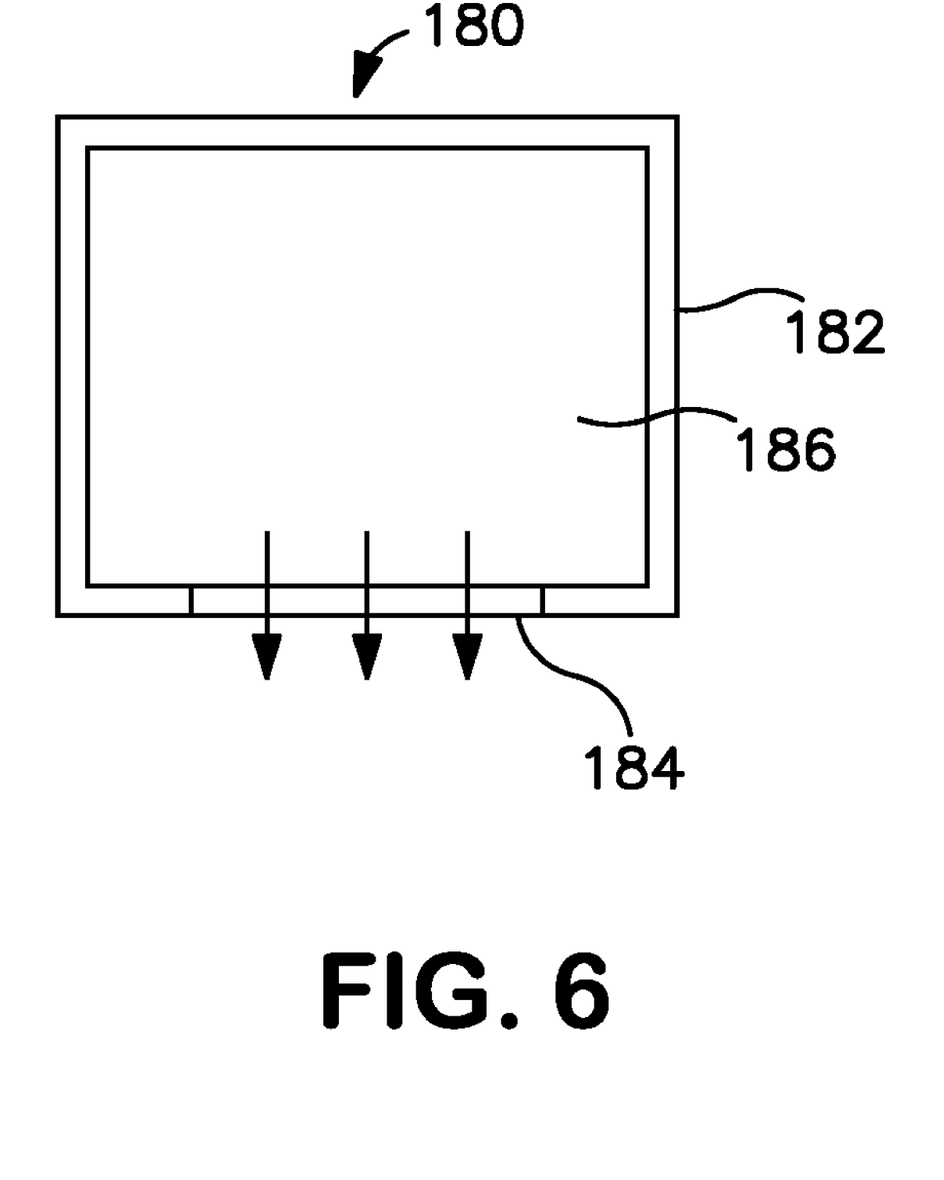
FIG. 6 is a schematic diagram of an example of a reference leak.

A reference leak unit 180 is shown in FIG. 6. A reference leak may be used to calibrate a leak detector. Reference leak unit 180 may include a container 182 having an opening that is sealed by a membrane 184. Preferably, membrane 184 is a composite membrane as described above. An interior volume 186 of the reference leak unit contains a test gas, such as helium. The helium leaks from the container 182 at a known rate that depends on the permeance of membrane 184.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for making a composite membrane, comprising;

selecting a semi-permeable membrane having a permeance S to a test gas and a porous membrane having a permeance P to the test gas to satisfy an equation $$1.\ P^2 \frac{dS}{dT} + S^2 \frac{dP}{dT} = 0,$$

where T is temperature and wherein the equation is evaluated at a temperature $T_0$ of about 300 K; and forming a composite membrane including the selected semi-permeable membrane and the selected porous membrane.

2. The method as defined in claim 1, wherein selecting comprises selecting materials and thicknesses of the semi-permeable membrane and the porous membrane to satisfy the equation.

3. The method as defined in claim 1, wherein forming a composite membrane includes forming a silica layer on front and back sides of the porous membrane.

4. The method as defined in claim 1, further comprising incorporating the composite membrane into a passage of a leak detector between an inlet and a test gas sensing unit.

5. The method as defined in claim 1, wherein selecting comprises selecting pore sizes of the porous membrane to satisfy the equation.

6. The method as defined in claim 1, wherein selecting comprises selecting the semi-permeable membrane and the porous membrane such that the net permeance N of the semi-permeable membrane and the porous membrane has zero slope as a function of temperature at the temperature $T_0$.

7. The method as defined in claim 1, wherein the semi-permeable membrane comprises a silica layer and wherein the porous membrane comprises a porous glass substrate.

8. The method as defined in claim 1, wherein selecting comprises selecting a material and a thickness of the semi-permeable membrane and selecting a material, a thickness and a pore size of the porous membrane.

9. The method as defined in claim 1, wherein selecting comprises adjusting parameters of the semi-permeable membrane and the porous membrane so that the composite membrane has a permeance to the test gas that varies by less than five percent over a temperature range of $T_0-20K$ to $T_0+20K$.

10. The method as defined in claim 1, wherein selecting comprises adjusting parameters of the semi-permeable membrane and the porous membrane so that the composite membrane has a permeance to the test gas that varies by less than one percent over a temperature range of $T_0-20K$ to $T_0+20K$.

* * * * *

UNITED STATES PATENT AND TRADEMARK OFFICE
CERTIFICATE OF CORRECTION

PATENT NO. : 7,779,528 B2  Page 1 of 1
APPLICATION NO. : 12/205642
DATED : August 24, 2010
INVENTOR(S) : Anthony G. Liepert et al.

It is certified that error appears in the above-identified patent and that said Letters Patent is hereby corrected as shown below:

Title page, Item (73), in "Assignee", delete "Virian," and insert -- Varian, --, therefor.

In column 10, line 4, in Claim 1, before " $P^2 \frac{dS}{dT} + S^2 \frac{dP}{dT} = 0.$ " delete "1.".

Signed and Sealed this
Tenth Day of May, 2011

David J. Kappos
*Director of the United States Patent and Trademark Office*